United States Patent Office 2,946,768
Patented July 26, 1960

2,946,768
CONDENSATION PRODUCTS OF CARBAMIC ACID ESTERS

Erich Klauke and Otto Bayer, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware No Drawing. Filed Aug. 12, 1957, Ser. No. 677,771

2 Claims. (Cl. 260—65)

This invention relates to new condensation products and a process for preparing the same. More particularly, the invention is concerned with condensation products from aromatic carbamic acid esters and carbonyl compounds, which condensation products can be split into organic isocyanates.

It has been found in accordance with the present invention that aromatic carbamic acid esters can be condensed with aldehydes and ketones to form new condensation products which when heated yield organic isocyanates. The condensation between the aromatic carbamic acid ester and the carbonyl compound according to the present invention is carried out in an acid medium and at elevated temperature. Accordingly, the process of the invention comprises reacting an aromatic carbamic acid ester with a carbonyl compound at elevated temperature and in the presence of a compound yielding hydrogen ions.

Although the ratio of the aromatic carbamic acid ester to the carbonyl compound may be varied within wide limits, a ratio within the range of 1:0.6 to 1:1 gives best results and is preferred. The condensation temperature is generally held in the neighborhood of 100° C. but the reaction may also be carried out at considerably lower or higher temperatures, if desired. A further variable is the reaction time, which may be as short as one-half hour or as long as several days. Depending upon the degree of condensation desired, the condensation time will generally range from about 1 hour to about 24 hours.

The condensation reaction according to the present invention may be carried out in the absence of a solvent but in general it is preferred to use a diluent, such as water or an inert organic solvent for the reactants. The use of water is particularly advisable if the carbonyl compound reactant is formaldehyde.

Aromatic carbamic acid esters which are suitable for use in the process of the invention include all aromatic compounds containing at least one carbamic acid ester group attached to an aromatic ring system. In the carbamic acid ester group or groups, which are represented by the formula —NHCOOR, the alcohol residue R may be any desired organic radical. The carbamic acid ester group or groups may be attached to a benzene ring or to a condensed aromatic ring system, such as naphthylene. Moreover, the aromatic ring or ring system bearing the —NHCOOR group or groups may be substituted once or several times, such as, for example, by alkyl or alkoxy radicals, halogen atoms and hydroxyl groups.

Aryl carbamic acid esters are obtainable by known methods. Thus, they may be formed by reacting an aromatic amine, which may be substituted, with a chloroformic acid ester or by reacting an alcohol with an aryl isocyanate. Illustrative examples of aryl carbamic acid esters which may be used as starting materials in the process of the invention include phenyl carbamic acid ethyl ester, m-hydroxyphenyl carbamic acid ethyl ester, m-hydroxyphenyl carbamic acid phenyl ethyl ester, m-toluyl carbamic acid ethyl ester, 3,5-dimethylphenyl carbamic acid methyl ester, 3-methoxyphenyl carbamic acid isobutyl ester, m-phenylene dicarbamic acid diethyl ester and α-naphthyl carbamic acid propyl ester.

Among the carbonyl compounds which may be employed in the process of the invention are any suitable aldehyde and/or ketone. Particularly suitable carbonyl compounds are formaldehyde and cyclohexanone. In place of formaldehyde, compounds that are capable of splitting off formaldehyde may be utilized, representative examples including para-formaldehyde and xylene-formaldehyde condensation products, such as those which are obtained by the action of excess formaldehyde with xylene in an acid medium.

Any suitable compound yielding hydrogen ions may be used to provide an acid condensation medium for carrying out the process of the invention. Thus, the reaction may be carried out in the presence of hydrochloric acid, sulfuric acid, phosphoric acid, boric acid, zinc chloride and the like.

The properties of the condensation products of the invention can be varied within wide limits. Thus, it is possible to react the carbonyl compound with two or more aryl carbamic acid esters rather than a single aryl carbamic acid ester. Furthermore, the aryl carbamic acid ester(s) may be used in admixture with one or more other aromatic compounds capable of undergoing a condensation reaction with the former. More specifically, phenols, phenol ethers and substitution products thereof, such as the cresols and the xylenols, may be mixed with the aryl carbamic acid esters prior to or during the condensation reaction with the carbonyl compound. It is, of course, desirable to adapt the reactivity of the compounds which do not contain carbamic acid ester groups to the reactivity of the aryl carbamic acid esters with which they are concurrently used. If it is desired that a compound which condenses slowly, for example, anisole, should be condensed with an active aryl carbamic acid ester, such as m-phenylene dicarbamic acid diethyl ester, the compound without carbamic acid ester groups should advantageously be used in a precondensed form.

Depending upon the conditions of the condensation, in particular time and temperature, the condensation products obtained take the form of viscous oils to spring-hard resins which are soluble in organic solvent. According to a specific embodiment of the process of the invention, the softening point of the condensation product formed is raised by reacting the condensation product of relatively low softening point with para-formaldehyde or a xylene-formaldehyde condensation product in the presence of an acid catalyst.

When heated to about 180°–250° C. the condensation products of the present invention split off the alcohol component of the urethane groups to form organic isocyanates. Consequently, the condensation products of the invention constitute masked or hidden isocyanates, i.e., organic compounds which do not contain free isocyanato groups but form free isocyanato groups when heated. In other words, at elevated temperatures, the condensation products of the invention perform as organic isocyanates.

It is believed that the condensation reaction of the present invention involves a linkage of aromatic rings by the carbonyl compound utilized, the reactive hydrogen atoms in the urethane groups remaining intact, but in this respect we do not wish to be restricted to any particular theory.

As compared with the hidden or masked polyisocyanates heretofore known, the condensation products of the invention have the advantage that they may be obtained in a great variety of forms. Thus, the moleuclar weight of the new condensation products and the number of masked isocyanato groups contained therein may be varied very easily.

The condensation products of the present invention can be used in all applications of hidden polyisocyanates. Thus, they can be reacted with compounds containing reactive hydrogen atoms to form polyurethanes. They are particularly useful in the preparation of stoving lacquers where they are mixed with polyhydroxyl compound, such as an hydroxyl polyester of the alkyd type, and an inert solvent to form coating compositions. Such coating compositions are applied to the object to be provided with a coating and then the coated object is exposed to an elevated temperature whereby the condensation product contained in the coating composition is converted into an organic isocyanate which reacts with the hydroxyl polyester to form a durable polyurethane coating on the object thus treated.

The invention is further illustrated by the following examples without being restricted thereto.

*Example 1*

724 parts by weight of finely powdered m-hydroxyphenyl carbamic acid ethyl ester are first of all stirred vigorously at 90° C. with 1 liter of water. 280 parts by weight of 30% formaldehyde solution are then added and the stirring operation is repeated. 16 cc. of concentrated hydrochloric acid are added dropwise to this mixture at 95° C. An oil very soon separates out, this settling as a darker layer. Stirring is continued for another 3 hours at temperatures between 95° and 98° C. The supernatant aqueous layer is decanted and the still hot resin is poured into cold water. The solidified resin is then finely powdered and washed thoroughly with water. 720 parts by weight of a slightly grey resin powder which is soluble in ethanol, acetone, acetic ester and methyl glycol acetate are obtained.

*Example 2*

200 parts by weight of phenyl carbamic acid ethyl ester are heated, while stirring, to 95° C. in a mixture of 500 cc. of water and 86 parts by weight of 30% aqueous formaldehyde solution. 100 cc. of concentrated hydrochloric acid are added. The reaction mixture is then kept for 20 hours while stirring at a temperature between 98° and 100° C. The upper aqueous layer is thereafter decanted, the resin is washed twice by stirring vigorously with hot water and the washing water is decanted. The substance is now slowly heated under a water jet vacuum while stirring until the internal temperature has reached 160°–170° C. Small traces of low-boiling fractions distill off. 200 parts by weight of a red viscous resin, which dissolves completely in acetone, ethyl acetate, ethanol and methyl glycol acetate, are obtained.

*Example 3*

193 parts by weight of 3,5-dimethyl phenyl carbamic acid ethyl ester are heated to 95° C. with 100 parts by weight of 30% aqueous formaldehyde solution and 500 cc. of water and, while stirring, 25 cc. of concentrated hydrochloric acid are then run in and condensation takes place while stirring for another 3 hours at 98°–100° C. After washing and heating as in Example 2, a hard reddish resin, which is completely soluble in cyclohexanone/acetic acid ester, is obtained.

*Example 4*

100 parts by weight of 3-methoxyphenyl carbamic acid isobutyl ester are heated while stirring to 95° C. with 40 parts by weight of 30% aqueous formaldehyde solution and 250 cc. of water. 10 cc. of concentrated hydrochloric acid are added and stirring is continued for another 15 hours at a temperature of 98°–100° C. After washing and heating as in Example 2, 102 parts by weight of a solid reddish resin, which is completely soluble in ethyl acetate, acetone, alcohol and methyl glycol acetate, are obtained.

*Example 5*

48 parts by weight of 3,5-dimethylphenyl carbamic acid ethyl ester and 52 parts by weight of 3-ethoxyphenyl carbamic acid ethyl ester are heated to 95° C. with 35 parts by weight of 30% aqueous formaldehyde solution and 250 cc. of water. 10 cc. of concentrated hydrochloric acid are added and condensation takes place while stirring for 6 hours at 98°–100° C. Working up in accordance with Example 2 yields a clear reddish brown resin which is completely soluble in acetone, ethyl acetate and ethanol.

*Example 6*

90 parts by weight of anisole are stirred for 10 hours at 98°–100° C. with 180 parts by weight of aqueous formaldehyde solution, 1 liter of water and 50 cc. of concentrated hydrochloric acid. 145 parts by weight of m-toluyl carbamic acid ethyl ester and 210 parts by weight of m-phenylene dicarbamic acid diethyl ester are then added to the reaction mixture and the reaction is allowed to proceed for another 12 hours at 98°–100° C. After being worked up in the usual manner as indicated in Example 2, a soft red resin, which is completely soluble in acetone, ethanol, ethyl acetate and methyl glycol acetate, is obtained.

*Example 7*

A mixture of 200 parts by weight of a thickly viscous xylene-formaldehyde condensation product (oxygen content 10.16%) with 200 parts by weight of m-phenylene dicarbamic acid diethyl ester, 0.4 part by weight of p-toluene sulfonic acid and 0.4 part by weight of p-toluene sulfochloride is slowly heated while stirring to 180° C. Water starts to split off at 145° C. After two hours, 16 cc. of water altogether have been split off. The hot resin is poured on to a metal sheet. In this way, 180 parts by weight of a reddish spring-hard resin, which is soluble in acetone, ethyl acetate, methyl glycol acetate and toluene, are obtained.

*Example 8*

100 parts of a polyester prepared by thermal condensation from 8 mols of terephthalic acid, 6 mols of ethylene glycol and 3 mols of glycerol, the polyester having an OH content of 4% are mixed with 30 parts of a resin prepared according to Example 6.

The mixture is dissolved in cresol/xylene (8:2) to give a 35% solution. A copper wire is passed through this solution and then through a heating device maintained at a temperature of 340° C.

By this procedure a durable polyurethane coating is formed on the copper wire which wire can be employed for many electrical purposes.

Although certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. The method of heating the condensation product of an N-aromatic substituted carbamic acid lower alkyl ester and a member selected from the group consisting of formaldehyde and cyclohexanone in an acid medium, said condensation product containing urethane groups, to split off alcohol at a temperature within the range of from about 180° C. to about 250° C. to form residual polymeric isocyanates.

2. The method of heating the condensation product of a member selected from the group consisting of phenyl carbamic acid ethyl ester, m-hydroxyphenyl carbamic acid ethyl ester, m-hydroxyphenyl carbamic acid phenyl ethyl ester, m-toluyl carbamic acid ethyl ester, 3,5-dimethylphenyl carbamic acid methyl ester, 3-methoxyphenyl carbamic acid isobutyl ester, m-phenylene dicarbamic acid diethyl ester and alpha-naphthyl carbamic acid propyl ester with a member selected from the group consisting of formaldehyde and cyclohexanone in an acid medium, said condensation product containing urethane groups, to split off alcohol at a temperature within the range of from about 180 C. to about 250° C. to form residual polymeric isocyanates.

References Cited in the file of this patent
FOREIGN PATENTS 461,352   Great Britain _____ Feb. 11, 1937